United States Patent [19]

Forgò et al.

[11] Patent Number: 4,496,694

[45] Date of Patent: Jan. 29, 1985

[54] PROCESS FOR PRODUCING A STORAGE-STABLE, MISCIBLE CURING AGENT FOR ACRYLATE RESIN ADHESIVES

[75] Inventors: Imre Forgò, Birsfelden, Switzerland; Jacques Francois, Huningue, France

[73] Assignee: Ciba Geigy Corporation, Ardsley, N.Y.

[21] Appl. No.: 485,933

[22] Filed: Apr. 18, 1983

[30] Foreign Application Priority Data

Apr. 27, 1982 [CH] Switzerland ............... 2566/82
Dec. 27, 1982 [CH] Switzerland ............... 7561/82

[51] Int. Cl.$^3$ .............................. C08L 61/28
[52] U.S. Cl. ............................ 525/163; 524/358; 524/512; 524/538; 524/542; 525/164; 525/401; 525/426; 525/428; 525/455; 525/456; 525/515
[58] Field of Search ............ 525/163, 164, 401, 426, 525/427, 428, 455, 456, 515, 243; 524/542, 593, 512, 358; 528/503

[56] References Cited

U.S. PATENT DOCUMENTS 3,890,407 6/1975 Briggs, Jr. et al. ............... 525/164
4,340,532 7/1982 Lee, Jr. et al. ............... 524/854

FOREIGN PATENT DOCUMENTS 0025015 3/1981 European Pat. Off. .
0044166 1/1982 European Pat. Off. .

OTHER PUBLICATIONS

Chem. Abst., vol. 95, 8503y, 1981.

*Primary Examiner*—Theodore E. Pertilla
*Attorney, Agent, or Firm*—Luther A. R. Hall

[57] ABSTRACT

Storage stable curing agents for acrylate adhesives, which curing agents are miscible with an acrylate resin adhesive, are produced by the mixing together of a polymerizable monomer, a thermoplast or elastomer soluble therein, and a liquid aldehyde/amine condensation product, and subsequent homogenisation of the mixture at elevated temperature. The curing agents, which optionally contain also stabilizers and curing accelerators, can be mixed with acrylate resin adhesives in any chosen quantity ratio between 2:1 and 1:2.

15 Claims, No Drawings

PROCESS FOR PRODUCING A STORAGE-STABLE, MISCIBLE CURING AGENT FOR ACRYLATE RESIN ADHESIVES

The invention relates to a process for producing a storage-stable curing agent for acrylate adhesives, which curing agent is miscible with acrylate resin, to the curing agents obtained by the process, and to the use of these curing agents in admixture with acrylate resin adhesives.

The reactive acrylate adhesives are two-component adhesive systems which are curable at room temperature, and which consist of (i) resin containing a compound forming a free radical and (ii) a curing agent. In the application of these adhesives, the resin and the curing agent are as a rule applied separately to the parts to be joined; the coated parts are afterwards joined, and the bond is then allowed to cure. This simple procedure has on the one hand many technical advantages, but on the other hand there can occur uncontrollable fluctuations in the strength of the bonds. These variations in strength are a result of the curing process being dependent, after the bringing together of resin and curing agent, on the diffusion of the curing agent through the resin layer.

It has already been established that the reactive acrylate resin adhesives with the curing agent mostly used separately (amine/aldehyde adduct formed from aniline and butyraldehyde) can be cured also when mixed together. The quantity ratio of resin and curing agent that is required to obtain an adequate bond is approximately 100:5. This ratio however is difficult to regulate in the case of a mechanical feeding in of controlled amounts. Furthermore, the viscosity values of resin and curing agent differ greatly (8–40 Pa.s for the resin and 200 mPa.s for the curing agent), and this renders difficult a homogeneous mixing of the thinly liquid curing agent in the viscous resin. With the manual application of the adhesive components, these have to be weighed out on account of the very large difference in the amounts, a procedure which is too involved for customary use. A further complication in the case of the separate application of the components is that all the resin and curing agent parts which do not come into contact with each other remain uncured because of the lack of a reaction partner, and therefore have to be removed from the bonded product.

There are described in the U.S. Pat. No. 4,340,532 acrylate resin adhesives and curing agents which are mixed together in a ratio of 1:1. These mixtures have been developed for use in dental practice, and for an industrial application they have the disadvantage that the one component is a liquid and the other a powder, so that in this case too there are mixing difficulties.

Curing agents which contain vinyl monomers, amine/aldehyde condensates, stabilisers and polymers are indeed commercially available, but on account of the increase in their viscosity in a relatively short space of time, their stability in storage is insufficient for many applications.

It has now been found that curing agents produced according to the present invention are stable with respect to viscosity and are moreover reactive, that is, they remain capable of polymerisation.

The process according to the invention comprises adding to a polymerisable monomer containing olefinic groups and optionally provided with a stabiliser, at a temperature of 50°–100° C., a thermoplast or elastomer each soluble in the monomer; introducing into the thickened solution thus formed a liquid aldehyde/amine condensation product; and homogenising the solution at elevated temperature. The thickened solution is preferably cooled before the addition of the aldehyde/amine condensation product. Homogenisation is performed preferably at a temperature of between 60° and 100° C.

Suitable polymerisable monomers are for example: acrylates, methacrylates, styrene, chlorostyrene, 2-chloro-1,3-butadiene and 2,3-dichloro-1,3-butadiene; especially methyl-, ethyl-, or butylmethacrylates and methacrylo-2-ethoxyethyl ester.

Liquid aldehyde/amine condensation products which can be used are those formed from: formaldehyde, acetaldehyde, propionaldehyde, hexaldehyde, heptaldehyde or crotonaldehyde with a primary or secondary, aliphatic or aromatic amine, for example ethylamine, n-butylamine, n- and iso-propylamine, n-hexylamine, t-butylamine, p-toluidine, xylidine or benzylamine, also diethylamine and diphenylamine. A reaction product of aniline and butyraldehyde is preferably used, 1 to 3.5 mols, particularly 1.5 to 3.0 mols, of butyraldehyde being used per 1 mol of aniline.

As stabilisers, there are preferably used quinone-like compounds, especially quinone itself, in amounts of 0.005 to 0.5% by weight, relative to the curing agent. Whether or not a stabiliser has to be used depends on the reactivity of the monomeric compounds. With the use for example of butyl acrylate, a stabiliser is not required (one can however naturally be present); whereas a stabiliser is necessary for example when methyl methacrylate is used.

The thermoplast used is preferably a polyacetal, polyacrylate, polymethacrylate, polystyrene or polyamide, or a copolymer made from styrene and acrylate or methacrylate, from styrene and butadiene or from styrene and isoprene, or a terpolymer from styrene, butadiene and acrylonitrile, the amount used being 5 to 85% by weight, relative to the curing agent, particularly 5 to 35% by weight.

Preferred elastomers are: polyurethane, butyl rubber or butadiene/acrylonitrile copolymer, likewise in an amount of 5 to 85% by weight, relative to the curing agent, especially 5 to 35% by weight.

The amount of thermoplast or elastomer in the curing agent depends on the desired viscosity of the curing agent. This viscosity value is advantageously adjusted to that of the acrylic resin adhesive, that is to say, it is between about 4 and 30 Pa.s.

The process according to the invention can be performed also with the addition of transition metal compounds acting as accelerators during bonding. These include compounds which contain the metal in the form of a chelate compound, for example with a β-diketone or ethylene- or propylenediamine, or in the form of a compound of an organic acid or of an alcohol, for example naphthenates (such as those of cobalt, nickel or manganese), octoates (for example those of copper), hexoates and propionates (for example those of iron). Preferred materials are acetylacetonates of vanadium, copper, cobalt and iron. There may be mentioned for example: Cu(II)-acetylacetonate, Cu-p-toluenesulfinate and Cu-naphthenate. They are added in amounts of 0.0005 to 1.0% by weight, relative to the weight of curing agent.

It is surprising that, even with the addition of accelerators of the types mentioned, the curing agent mixtures remain stable with respect to viscosity and with respect to activity, and also with the presence of a quinone as stabiliser.

Acrylate resin adhesives can be produced for example according to the U.S. Pat. No. 4,278,106.

Production of acrylate resin adhesive A 58 parts by weight of methylmethacrylate, 10 parts by weight of methacrylic acid, 1 part by weight of ethylene glycol dimethacrylate, 0.5 part by weight of quinone and 27 parts by weight of acrylonitrile/-butadiene/styrene copolymer powder are dissolved at 50° C. under nitrogen. Two parts by weight of chlorosulfophenylmaleimide are subsequently added at room temperature, and the mixture is stirred for 1 hour. There are then added successively 1 part of cumene hydroperoxide and 0.5 part of butylene glycol diglycide, and the mixture is homogenised. The Brookfield viscosity (determined with the spindle No. 4 at 50 r.p.m.) of the acrylate resin adhesive A is 8–12 Pa.s.

Relative to the total amount of curing agent, this contains preferably 10 to 90% by weight, particlarly 60 to 80% by weight, of the polymerisable monomer, 5 to 25% by weight, especially 10 to 18% by weight, of the aldehyde/amine condensate, 5 to 85% by weight, particularly 10 to 20% by weight, of the thermoplast or elastomer, and optionally the given amounts of stabiliser and/or of metal complex.

The term 'parts' in the following Examples denotes parts by weight.

EXAMPLE 1

Production of a slow-acting curing agent miscible with the resin adhesive in the ratio of 1:1

64.7 parts of methyl methacrylate and 0.3 part of quinone are well mixed at room temperature under nitrogen in a graduated flask with ground glass stopper. 20 parts of polyacetal are afterwards added, and the liquid mixture is stirred at 80° C. for 1 hour (the polyacetal has been produced from vinyl alcohol and butyraldehyde, and has a molecular weight of between 34,000 and 38,000; the viscosity of a 10% solution in 95% ethanol is 55 mPa.s, measured in the Oswald viscosimeter). The solution is then cooled to room temperature, and there are subsequently added 15 parts of a product consisting of about 40% of a condensation product formed from aniline and butyraldehyde ("Vanax 808" ®). The solution is homogenised for 2 hours at 80° C. and then cooled. This curing agent can be mixed with the resin adhesive A in any chosen mixture ratio (with no necessity for accurate weighing) within the range of 2:1 to 1:2, depending on the desired curing time. The Brookfield viscosity of the curing agent at the start is 8 Pa.s and after 7 days of storage at 60° C. it is 10 Pa.s.

EXAMPLE 2

Production of a quick-acting curing agent miscible with the resin in the ratio of 1:1

The procedure is carried out as in Example 1 except that 0.005 part of copper acetylacetate is added to the amine/aldehyde condensation product, and that afterwards the solution is heated.

The Brookfield viscosity at the start is 6 Pa.s, and after 7 days of storage at 60° C. it is 7 Pa.s.

EXAMPLE 3

The procedure is carried out in the manner described in Example 2 except that 0.005 part of copper-p-toluenesulfinate is mixed in instead of copper acetylacetonate.

The Brookfield viscosity at the start is 9 Pa.s, and after 7 days of storage at 60° C. it is unchanged.

EXAMPLE 4

The procedure is carried out in the manner described in Example 1 except that instead of 20 parts of polyacetal, there is used the same amount of a polyurethane elastomer (Brookfield viscosity of the polyurethane: 15% solution in ethyl methyl ketone at 23° C.: 1.6–2 Pa.s).

The Brookfield viscosity at the start is 26 Pa.s, and after 7 days of storage at 60° C. it is 22 Pa.s.

EXAMPLE 5

The procedure is carried out as described in Example 4 except that 0.005 part of copper acetylacetonate is added to the amine/aldehyde condensate.

The Brookfield viscosity at the start is 28 Pa.s, and after 7 days of storage at 60° C. it is 20 Pa.s.

The behaviour of a 1:1 mixture of acrylate resin adhesive A and of the curing agents according to Examples 1–5 is shown in the following Table I. The curing is performed in all cases with fresh acrylate resin A. The substrate used is degreases aluminium sheet. For the determination of the initial adhesion, the curing agents are used in the freshly prepared condition. The initial adhesion is expressed in terms of the time which passes between the placing together of the coated sheets and the point of time at which the sheets just adhere to one another without falling apart. For ascertaining the tensile shearing strength, there is used a freshly prepared curing agent for the mixture with the acrylate resin in the first case ("0 value"), and in the second case an identical curing agent which has been stored at 60° C. for 7 days (7 days/60° C.). The measurements are carried out 45 or 60 minutes and 24 hours after the mixing at room temperature ("RT").

TABLE I

| Curing agent | Initial adhesion | Tensile shearing strength in N/mm$^2$ | | | |
| --- | --- | --- | --- | --- | --- |
| | | after 45 min. at RT | | after 24 h at RT | |
| | | 0 value | 7 days/60° C. | 0 value | 7 days/60° C. |
| Example 1 | 30 min | 1* | 5* | 20 | 22 |
| Example 2 | 5 min | 16 | 15 | 19 | 20 |
| Example 3 | 5 min | — | — | 16 | 22 |
| Example 4 | 30 min | 3* | 6* | 24 | 25 |
| Example 5 | 5 min | 12 | 20 | 22 | 25 |

*after 60 min. at RT

EXAMPLES 6 TO 39

64.7 parts of methyl methylacrylate and 0.3 part of quinone are well mixed at room temperature under nitrogen in a graduated flask with ground glass stopper; and 20 parts of a polymerisable monomer are then added as thickener. After the dissolving of the constituents, 15 parts of an amine/aldehyde adduct and optionally the metal salt are added, and the mixture is homogenised at 80° C. for 2 hours. It is very important that the sequence of the additions of starting materials be observed, since otherwise a quinone+amine/aldehyde condensation product forms an insoluble precipitate in methyl methacrylate.

In Table II is shown the viscosity of the prepared curing agents, measured according to Brookfield, that is, the initial value, and the value after 7 days' storage at 60° C.

curing agent after storage for 7 days at 60° C. (HB). Degreased aluminium sheets are bonded in these tests.

TABLE III

| | Tensile shearing strength in N/mm² | | | |
|---|---|---|---|---|
| | Curing at RT, 45 minutes | | Curing at RT, 24 hours | |
| Example | HA | HB | HA | HB |
| 6 | dela | dela | 12 | 16 |
| 7 | 6 | 14 | 12 | 16 |
| 8 | 1 | 1 | 12 | 15 |
| 9 | 1 | 1 | 14 | 12 |
| 10 | dela | dela | 6 | 6 |
| 11 | 6 | 8 | 14 | 15 |
| 12 | dela | 1 | 2 | 9 |

TABLE II

| | | | Viscosity in mPa · s | |
|---|---|---|---|---|
| Ex. | Thickener (%) | Metal salt (%) | initial value | after 7 days at 60° C. |
| 6 | polystyrene (30) | — | 1900 | 3000 |
| 7 | " | Cu—Ac.Ac.(0,005) | 1900 | 2900 |
| 8 | " | Co—Naph.(0,1) | 1900 | 2600 |
| 9 | " | V—Ac.Ac.(0,005) | 1900 | 3900 |
| 10 | SBA (30) | — | 860 | 1100 |
| 11 | " | Cu—Ac.Ac.(0,005) | 860 | 1200 |
| 12 | " | Co—Naph.(0,1) | 860 | 1300 |
| 13 | " | V—Ac.Ac.(0,005) | 860 | 1300 |
| 14 | polyvinylbutyral ("Butvar" ®, Monsanto) | — | 5900 | 11500 |
| 15 | polyvinylbutyral ("Butvar" ®, Monsanto) | Cu—Ac.Ac.(0,005) | 5900 | 11800 |
| 16 | polyvinylbutyral ("Butvar" ®, Monsanto) | Co—Naph.(0,1) | 5900 | 10900 |
| 17 | polyvinylbutyral ("Butvar" ®, Monsanto) | V—Ac.Ac.(0,005) | 5900 | 11600 |
| 18 | polyurethane elastomer (16) | — | 8100 | 7700 |
| 19 | polyurethane elastomer (16) | Cu—Ac.Ac.(0,005) | 8100 | 5200 |
| 20 | polyurethane elastomer (16) | Co—Naph.(0,1) | 8100 | 2200 |
| 21 | polyurethane elastomer (16) | V—Ac.Ac.(0,005) | 8100 | 6100 |
| 22 | acrylic ester polymer (30) | — | 80 | 240 |
| 23 | acrylic ester polymer (30) | Cu—Ac.Ac.(0,005) | 80 | 350 |
| 24 | acrylic ester polymer (30) | Co—Naph.(0,1) | 80 | 160 |
| 25 | acrylic ester polymer (30) | V—Ac.Ac.(0,005) | 80 | 400 |
| 26 | PVC (high-polymer) | — | paste | paste |
| 27 | PVC (high-polmer) | Cu—Ac.Ac.(0,005) | " | " |
| 28 | " | Co—Naph.(0,1) | " | " |
| 29 | " | V—Ac.Ac(0,005) | " | " |
| 30 | acrylonitrile-butadiene copolymer (65) | — | 6400 | 10200 |
| 31 | acrylonitrile-butadiene copolymer (65) | Cu—Ac.Ac.(0,005) | 6400 | 16600 |
| 32 | acrylonitrile-butadiene copolymer (65) | Co—Naph.(0,1) | 5400 | 10800 |
| 33 | acrylonitrile-butadiene copolymer (65) | V—Ac.Ac.(0,005) | 6400 | 11700 |
| 34 | SBS (20) | — | 3400 | 6700 |
| 35 | " | Cu—Ac.Ac.(0,005) | 3400 | 6900 |
| 36 | " | Co—Naph.(0,1) | 3400 | 6500 |
| 37 | " | V—Ac.Ac.(0,005) | 3400 | 7600 |
| 38 | ABS (23) | — | 3700 | 5000 |
| 39 | " | Cu—Ac.Ac.(0,005) | 3700 | 4300 |

SBA = styrene/butadiene/acrylate terpolymer
PVC = polyvinyl chloride
SBS = styrene/butadiene/styrene terpolymer
ABS = acryl/butadiene/styrene terpolymer
Cu—Ac.Ac. = Cu(II)acetylacetonate
Co.Naph. = Co-naphthenate, 8% solution
V—Ac.Ac. = vanadyl acetylacetonate In Table III are given the tensile strength values, for the Examples 6–39, of bonds with the acrylate resin A after curing at room temperature for 45 minutes and for 24 hours, whereby in the first case is used a freshly prepared curing agent (HA), and in the second case a TABLE III-continued

| Example | Tensile shearing strength in N/mm² | | | |
|---|---|---|---|---|
| | Curing at RT, 45 minutes | | Curing at RT, 24 hours | |
| | HA | HB | HA | HB |
| 13 | 1 | 1 | 10 | 4 |
| 14 | 1 | 1 | 24 | 27 |
| 15 | 23 | 23 | 21 | 32 |
| 16 | 2 | 1 | 25 | 29 |
| 17 | 4 | 9 | 27 | 23 |
| 18 | 1 | 1 | 22 | 22 |
| 19 | 13 | 23 | 22 | 30 |
| 20 | 5 | 3 | 23 | 26 |
| 21 | 4 | 7 | 22 | 20 |
| 22 | 1 | 1 | 8 | 9 |
| 23 | 4 | 7 | 8 | 11 |
| 24 | 2 | 2 | 7 | 12 |
| 25 | 3 | 4 | 11 | 8 |
| 26 | 1 | 1 | 18 | 16 |
| 27 | 1 | 1 | 3 | 3 |
| 28 | 1 | 2 | 21 | 19 |
| 29 | 1 | 1 | 23 | 20 |
| 30 | dela | dela | 4 | 5 |
| 31 | 3 | 5 | 7 | 9 |
| 32 | 1 | 1 | 5 | 10 |
| 33 | 3 | 3 | 11 | 5 |
| 34 | dela | dela | 8 | 8 |
| 35 | 8 | 6 | 12 | 13 |
| 36 | 1 | 3 | 9 | 11 |
| 37 | 2 | 3 | 11 | 10 |
| 38 | 7 | 9 | 26 | 26 |
| 39 | 7 | 9 | 8 | 9 | dela = delaminated, that is, no adhesion

From Table III can also be seen the adhesion-accelerating action of the metal salts.

What is claimed is:

1. A process for producing a storage-stable curing agent for reactive acrylate adhesives, which curing agent is miscible with an acrylate resin adhesive, which process comprises
   (a) adding to a polymerisable monomer containing an olefinic group or groups, at a temperature of 50° to 100° C., a thermoplast or elastomer, which is soluble in said monomer, and which is selected from the group consisting of a polyacetal, polyacrylate, polymethacrylate, polystyrene, polyamide, copolymer of styrene and an acrylate, copolymer of styrene and a methacrylate, copolymer of styrene and butadiene, copolymer of styrene and isoprene, terpolymer of styrene, butadiene and acrylonitrile, polyurethane, butyl rubber and butadiene/acrylonitrile copolymer, in an amount of 5 to 85% by weight, relative to the amount of curing agent;
   (b) introducing into the thickened solution formed in step (a) a liquid aldehyde/amine condensation product; and
   (c) homogenising the solution mixture of step (b) at elevated temperature.

2. A process according to claim 1, wherein the thickened solution is cooled before the addition of the aldehyde/amine condensation product is made.

3. A process according to claim 1, wherein homogenisation is performed at a temperature of 60° to 100° C.

4. A process according to claim 1, wherein a complex compound of a transition metal is added, as a curing accelerator, to a mixture, the amount added being 0.0005 to 1.0% by weight, relative to the total amount of curing agent.

5. A process according to claim 1, wherein the polymerisable monomer used is an acrylate, methacrylate, styrene, chlorostyrene, 2-chloro-1,3-butadiene or 2,3-dichloro-1,3-butadiene.

6. A process according to claim 5, wherein methyl-, ethyl- or butylmethacrylate or methacrylic acid-2-ethoxyethyl ester is used.

7. A process according to claim 1, wherein the employed thermoplast is a polyacetal, polyacrylate, polymethacrylate, polystyrene or polyamide, or a copolymer formed from styrene and acrylate or methacrylate, styrene and butadiene or styrene and isoprene, in an amount of 5 to 35% by weight, relative to the amount of curing agent.

8. A process according to claim 1, wherein the elastomer used is a polyurethane, butyl rubber or a butadiene/acrylonitrile copolymer, in an amount of 5 to 35% by weight, relative to the amount of curing agent.

9. A process according to claim 1, wherein the liquid aldehyde/amine condensation product used is one formed from aniline and butyraldehyde.

10. A process according to claim 1 wherein the polymerisable monomer contains a stabiliser.

11. A process according to claim 10, wherein there is added to the polymerisable monomer a quinone as stabiliser.

12. A curing agent produced according to claim 1 for reactive acrylate adhesives.

13. A curing agent according to claim 12, which contains, relative to its total amount, 10 to 90% by weight of the polymerisable monomer, 5 to 25% by weight of the aldehyde/amine condensation product, and 5 to 85% by weight of the thermoplast or elastomer.

14. A curing agent according to claim 13 which contains 0.0005% to 1% by weight of a complex compound of a transition metal.

15. A curing agent according to claim 13 which contains 0.005 to 0.5% by weight of a stabiliser.

* * * * *